United States Patent
Mandli et al.

(10) Patent No.: US 11,557,798 B2
(45) Date of Patent: Jan. 17, 2023

(54) METHOD AND SYSTEM FOR PREDICTING ONSET OF CAPACITY FADING IN A BATTERY

(71) Applicant: SAMSUNG ELECTRONICS CO., LTD., Suwon-si (KR)

(72) Inventors: Aravinda R. Mandli, Bangalore (IN); Anshul Kaushik, Bangalore (IN); Krishnan S. Hariharan, Bangalore (IN); Ashish Khandelwal, Bangalore (IN); Ankit Yadu, Bangalore (IN); Jeonghoon Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 491 days.

(21) Appl. No.: 16/704,725

(22) Filed: Dec. 5, 2019

(65) Prior Publication Data
US 2020/0203780 A1 Jun. 25, 2020

(30) Foreign Application Priority Data
Dec. 21, 2018 (IN) .............................. 201811048646

(51) Int. Cl.
| | | |
|---|---|---|
| *H01M 14/00* | (2006.01) | |
| *H01M 10/44* | (2006.01) | |
| *H01M 10/48* | (2006.01) | |
| *H01M 10/42* | (2006.01) | |

(Continued)

(52) U.S. Cl.
CPC .......... *H01M 10/448* (2013.01); *G06N 20/00* (2019.01); *H01M 10/4285* (2013.01); *H01M 10/488* (2013.01); *H02J 7/005* (2020.01); *H02J 7/00712* (2020.01); *H01M 2010/4292* (2013.01)

(58) Field of Classification Search
CPC ............ H01M 10/448; H01M 10/443; H01M 10/446; H01M 10/44; H01M 10/488; H01M 10/486; H01M 10/4285; H01M 10/4271; H01M 10/425; H01M 2010/4292; G06N 20/00; H02J 7/005; H02J 7/00712
See application file for complete search history.

(56) References Cited

U.S. PATENT DOCUMENTS

| | | |
|---|---|---|
| 9,547,046 B2 | 1/2017 | Tao et al. |
| 2004/0220758 A1 | 11/2004 | Barsoukov et al. |
| 2015/0349385 A1 | 12/2015 | Hu et al. |

(Continued)

FOREIGN PATENT DOCUMENTS

JP  6252487 B2  12/2017

OTHER PUBLICATIONS

International Search Report dated Mar. 9, 2020 issued by the International Searching Authority in counterpart International Application No. PCT/KR2019/016922 (PCT/ISA/210).

(Continued)

*Primary Examiner* — Raymond Alejandro
(74) *Attorney, Agent, or Firm* — Sughrue Mion, PLLC

(57) ABSTRACT

A method for predicting an onset of a capacity fading in a battery includes measuring, over a period of time, a plurality of parameters related to charging and discharging cycles of the battery; detecting, based on the measured plurality of parameters, the onset of the capacity fade in the battery; and providing a notification on the electronic device indicating the detected onset of the capacity fade.

18 Claims, 14 Drawing Sheets

(51) Int. Cl.
*H02J 7/00* (2006.01)
*G06N 20/00* (2019.01)

(56) References Cited

U.S. PATENT DOCUMENTS

2017/0108553 A1   4/2017  Ganesan et al.
2017/0146605 A1   5/2017  Mattisson et al.
2018/0316204 A1*  11/2018  Basu .................... H01M 10/48

OTHER PUBLICATIONS

Written Opinion dated Mar. 9, 2020 issued by the International Searching Authority in counterpart International Application No. PCT/KR2019/016922 (PCT/ISA/237).

* cited by examiner

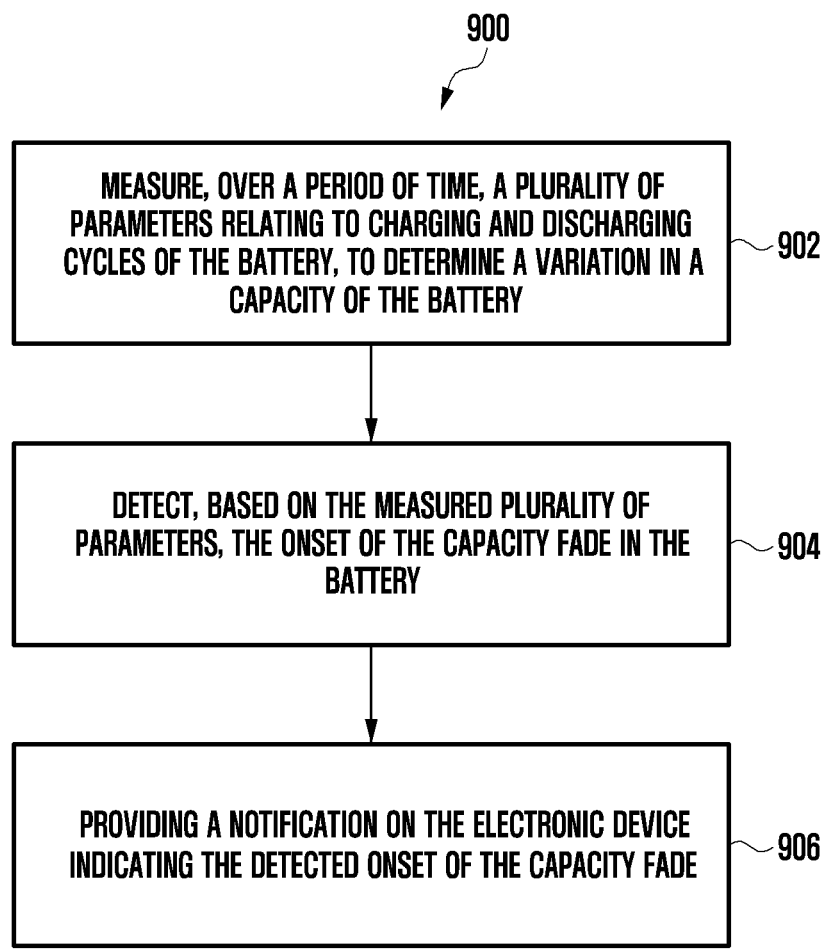

METHOD AND SYSTEM FOR PREDICTING ONSET OF CAPACITY FADING IN A BATTERY

CROSS-REFERENCE TO RELATED APPLICATION(S)

This application is based on and claims priority under 35 U.S.C. § 119 to Indian Provisional Patent Application No. 201811048646 filed on Dec. 21, 2018 and Indian Non-Provisional Patent Application No. 201811048646 filed on Nov. 7, 2019, in the Indian Patent Office, the disclosures of which are incorporated by reference herein in their entireties.

FIELD

The disclosure relates to electronic devices and batteries that power the electronic devices, and more particularly, to methods and systems for predicting an onset of a capacity fading in a battery.

BACKGROUND

With the advent of technology, knowledge of monitoring a battery state of health (SOH) and estimation of battery life-time has become a principle aspect for successful market assessment of electronic devices powered by rechargeable batteries. However, capacity of battery to store energy decreases over time. For example, after a year of usage, the battery might not be able to retain charge and store energy as efficiently as before. In particular, reduced capacity in aged Li-ion battery directly limits electrical performance of the Li-ion battery through energy loss.

Further, the battery might not be able to provide sufficient power to all applications of the electronic device even though the battery is not fully discharged. For example, if the battery is discharged at a low rate, for example, at 0.2 Coulombs (C), the battery can provide approximately 90% of capacity of a new battery whereas if the battery is discharged at higher rate, for example, IC, the battery can provide approximately 50% capacity of the new battery.

Further, it has been observed that the capacity of the battery degrades or reduces slowly until a certain time and reduces drastically after the certain time lapses. Thus, the capacity degradation of the battery occurs in two phases, namely, a slow linear phase followed by a rapid non-linear phase. Typically, such nonlinear drop happens within a few charge-discharge cycles. Such rapid non-linear drop is usually detrimental to usage of the electronic devices as undesirable events like sudden shut-down, lagging performance, and loss of power or inadequate power under certain high load conditions, etc., can occur suddenly and typically in few cycles prior to actual non-linear drop. This results in an inconvenience to the user leading to poor user experience and safety issues.

Various solutions have been developed to monitor the SOH and state of life (SOL) by estimating the capacity and predicting remaining useful life (RUL) for effective device maintenance at an appropriate time. In one solution, capacity of the battery is determined based on at least changes of state of charge (SOC) values estimated at a first and second time and a net charge flow of the battery and applying a particle filter to a capacity degradation formula using the determined capacity to form a capacity degradation model and determining the RUL using the capacity degradation model using a pre-defined end of service threshold.

In another solution, cycle life was proposed to be improved by homogeneous pressure distribution in the cell and using negative active materials that are resilient to elevated discharge potentials as they appear in aged cells such as improved carbons or lithium titanate. Also, a sufficiently oversized negative electrode and suitable electrolyte additives can help to avoid lithium plating. However, all these solutions cannot predict nonlinear capacity fading behavior in lithium-ion batteries.

SUMMARY

In accordance with an aspect of the disclosure, a method for predicting onset of capacity fading in a battery is disclosed. The method includes determining an incremental capacity curve for a current cycle of the battery. The method includes measuring, over a period of time, a plurality of parameters relating to charging and discharging cycles of the battery, to determine a variation in a capacity of the battery. The method includes detecting, based on the measured plurality of parameter, the onset of the capacity fade in the battery. The method includes providing a notification on the electronic device indicating the detected onset of the capacity fade.

In accordance with an aspect of the disclosure, a system for predicting onset of capacity fading in a battery is disclosed. The system includes a memory and at least one processor communicatively coupled to the battery and the memory. The at least one processor is configured to execute computer-readable instructions to measuring, over a period of time, a plurality of parameters relating to charging and discharging cycles of the battery, to determine a variation in a capacity of the battery. The at least one processor is configured to execute computer-readable instructions to detect, based on the measured plurality of parameter, the onset of the capacity fade in the battery. The at least one processor is configured to execute computer-readable instructions to provide a notification on the electronic device indicating the detected onset of the capacity fade.

According to embodiments of the disclosure, there is provided a method and a system for predicting the occurrence of an event of non-linear drop in battery. Further, at least one action can be performed in response to the predicted onset of the capacity fade, including, at least visually indicating the user about the predicted onset of the capacity fade. This results in preventing untoward incidents and leads to enhanced user experience with increased safety.

BRIEF DESCRIPTION OF THE DRAWINGS

The above and other aspects, features, and advantages of certain embodiments of the present disclosure will be more apparent from the following description, taken in conjunction with the accompanying drawings, in which:

FIG. 9 illustrates flow diagram of a method for predicting onset of capacity fade in the battery in the electronic device, according to an embodiment.

Figure 1:
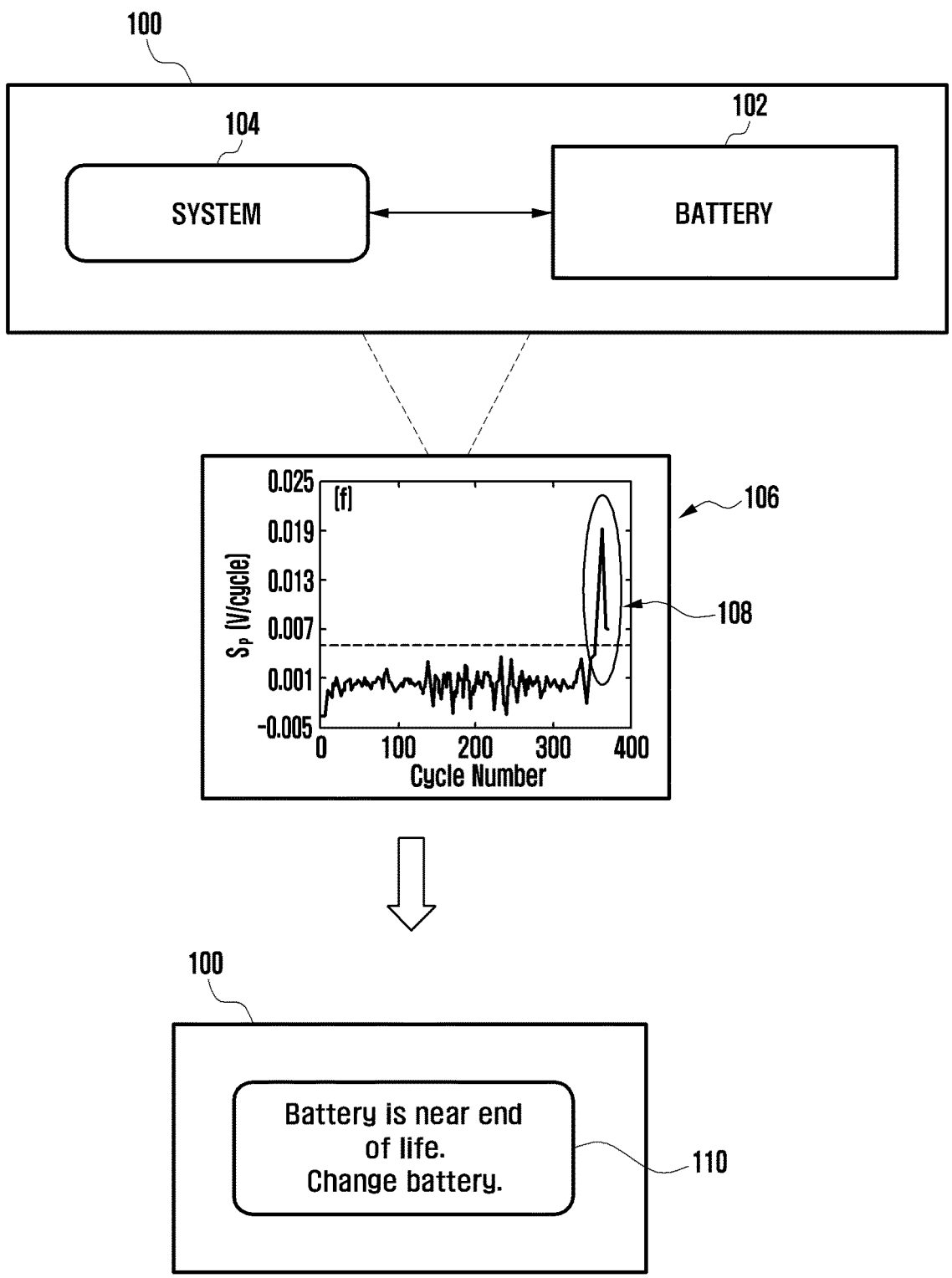
FIG. 1 illustrates a block diagram for predicting onset of capacity fade in a battery in an electronic device, according to an embodiment.

Further, skilled artisans will appreciate that elements in the drawings are illustrated for simplicity and may not have been necessarily been drawn to scale. For example, the flow charts illustrate the method in terms of some operations to help to improve understanding of aspects of the present disclosure. Furthermore, in terms of the construction of the device, one or more components of the device may have been represented in the drawings by the related art symbols, and the drawings may show some specific details that are pertinent to understanding embodiments of the disclosure so as not to obscure the drawings with details that will be readily apparent to those of ordinary skill in the art having benefit of the description herein.

DETAILED DESCRIPTION

For the purpose of promoting an understanding of the principles of the disclosure, reference will now be made to certain embodiments illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates. Unless otherwise defined, all technical and scientific terms used herein have the same meaning as commonly understood by one of ordinary skilled in the art to which this disclosure belongs. The system, methods, and examples provided herein are illustrative only and not intended to be limiting. Embodiments of the present disclosure will be described below in detail with reference to the accompanying drawings.

FIG. 1 illustrates an example electronic device 100, in accordance with an example embodiment. Examples of the electronic device 100 include, but not limited to, mobile devices such as smartphone, notebooks, laptops, personal digital assistant (PDA), etc., wearable devices such as smartwatches, etc., portable medical devices, smart devices such as smart or robotic vacuum cleaner, etc., electric vehicles, hybrid electric vehicles. The electronic device 100 may be powered by the battery 102. The battery 102 can represent a single or individual cell or a battery pack including of any number of identical cells. In an embodiment, the battery 102 is a rechargeable battery and is a lithium-ion battery.

The electronic device 100 may include a system 104 coupled with the battery 102. The system 104 may be coupled with the battery 102 using various appropriate techniques. In an example, the system 104 may include one or more high current terminals to connect with the battery 102.

In accordance with embodiments of the present disclosure, the system 104 may measure, over a period of time, a plurality of parameters relating to charging and discharging cycles of the battery, to determine a variation in a capacity of the battery 102, as illustrated by plot 106. The system 104 may detect the onset of capacity fade in the battery 102 based on the measured plurality of parameters, as illustrated by slope 108. The term "capacity" of the battery 102 may be defined as the available electric charge stored in the battery 102 after the battery 102 is fully charged. The capacity of the battery is defined as total Amp-hours (Ah) available when the battery is discharged at a certain discharge current (specified as a C-rate) from 100 percent state-of-charge to a cut-off voltage or minimum allowable voltage. The cut-off voltage is the voltage that generally defines the "empty" state of the battery. As such, the term "capacity fade" may be defined as capacity loss during a discharge cycle of the battery 102, for example, while performing any activity on or with respect to the electronic device 100. The system 104 may provide a notification 110 on the electronic device 100 indicating the detected onset of the capacity fade in the battery 102. In an example as illustrated in FIG. 1, the notification 110 is a text notification indicating "Battery is near end of life; Change battery".

Figure 2:
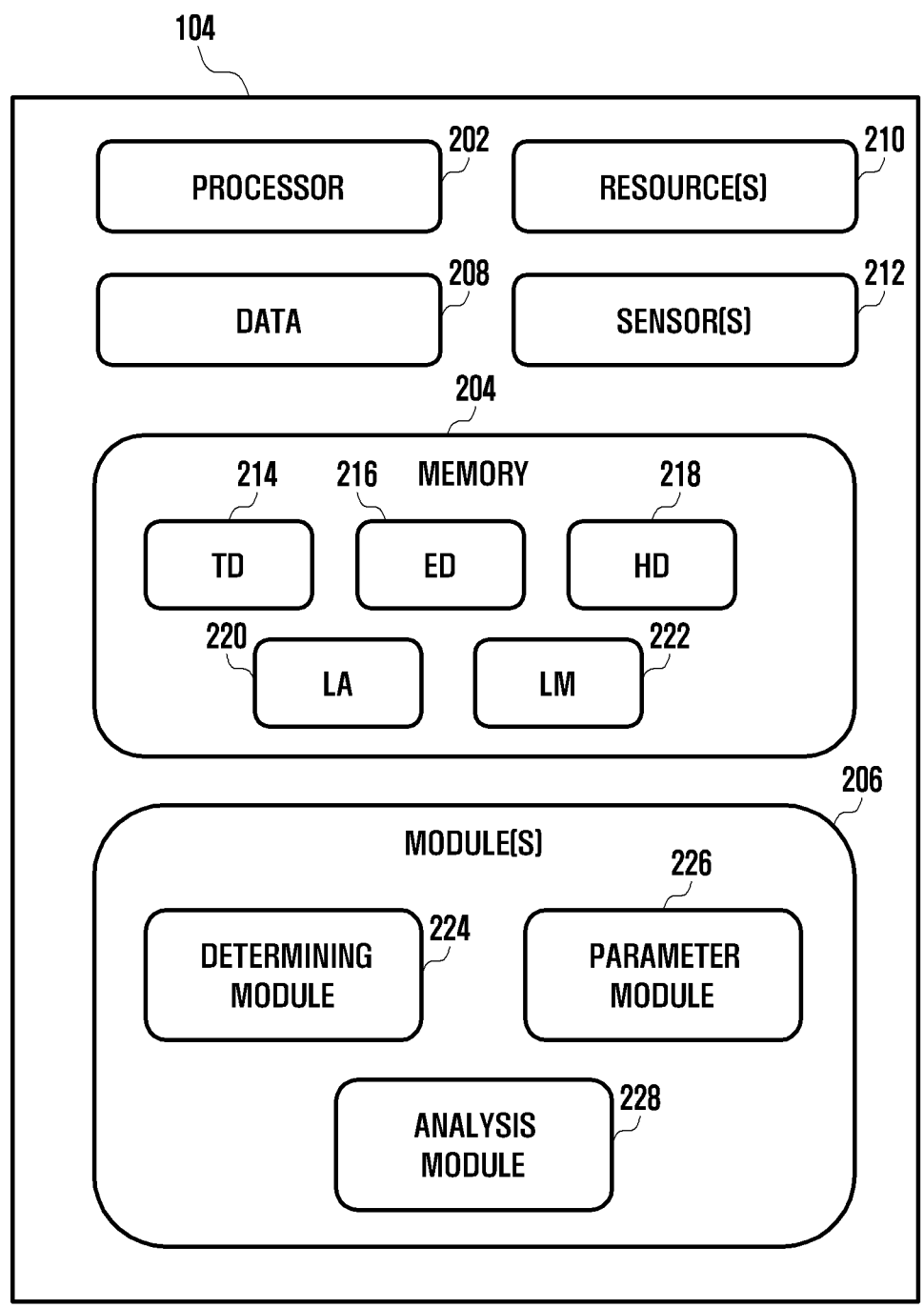
FIG. 2 illustrates a schematic block diagram of a system for predicting the onset of capacity fade in the battery in the electronic device, according to an embodiment.

FIG. 2 illustrates a schematic block diagram of the system 104 predicting the onset of capacity fade in the battery 102, in accordance with an embodiment. The system 104 may include at least one processor 202, a memory 204, one or more modules, i.e., module(s) 206, and a data 208. The processor 202, the memory 204, and the module(s) 206 may be communicatively coupled with each other. The data 208 may serve, among other things, as a repository for storing data processed, received, and/or generated by the module(s) 206.

In an example embodiment, the system 104 is a battery management system. As such, the system 104, in addition to predicting capacity fade, may also perform various functions such as protecting the battery 102 during charging and discharging, monitoring state of the battery 102 such as voltage, current, temperature, SOC, SOH, etc., calculating secondary data related to the battery 102 such as charge current limit (CCL), discharge current limit (DCL), total number of cycles, total energy delivered since last cycle, etc., balancing the battery 102, etc. As such, the system 104 may include one or more various resources, i.e., resource(s) 210, and one or more sensors, i.e., sensor(s) 212, for performing the various functions.

The processor 202 may be a single processing unit or a number of units, all of which could include multiple computing units. The processor 202 may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 202 may be configured to fetch and/or execute computer-readable instructions and/or data, e.g., the data 208 or the data stored in the memory 204.

The memory 204 may include any non-transitory computer-readable medium including, for example, volatile memory, such as static random access memory (SRAM) and/or dynamic random access memory (DRAM), and/or non-volatile memory, such as read-only memory (ROM), erasable programmable ROM (EPROM), and flash memory. The memory 204 may include training data (TD) 214 and an estimated data (ED) 216. The estimated data 216 is indicative of a reduction in a maximum charged capacity of each of a set of representative batteries for a predetermined number of cycles over a predetermined time period and an increase in resistance within each of the set of representative batteries. The memory 204 may also store historical data (HD) 218, one or more of learning algorithms, i.e., learning algorithm(s) (LA) 220, and a learned model (LM) 222.

The module(s) 206, among other things, may include routines, programs, objects, components, data structures, etc., which perform particular tasks or implement data types. The module(s) 206 may also be implemented as signal processor(s), state machine(s), logic circuitries, and/or any other device or component that manipulate signals based on operational instructions.

Further, the module(s) 206 may be implemented in hardware, instructions executed by at least one processing unit, such as the processor 202, or by a combination thereof. The processing unit may include a computer, a processor, a state machine, a logic array and/or any other suitable devices capable of processing instructions. The processing unit may be a general-purpose processor that executes instructions to cause the general-purpose processor to perform operations or, the processing unit may be dedicated to performing the required functions. In an embodiment, the module(s) 206 may be machine-readable instructions (software) which, when executed by a processor/processing unit, perform any of the described functionalities.

In an embodiment, the module(s) 206 may include a determining module 224, a parameter module 226, and an analysis module 228. The determining module 224, the parameter module 226, and the analysis module 228 may be in communication with each other. According to the embodiments of the operations described herein as performed by the system 104, the determining module 224, the parameter module 226, and the analysis module 228 may be performed by at least one processor (e.g., the processor 202) executing program code that includes instructions (e.g., the module(s) 206) corresponding to the operations. The instructions may be stored in a memory (e.g., the memory 204).

Figure 3:
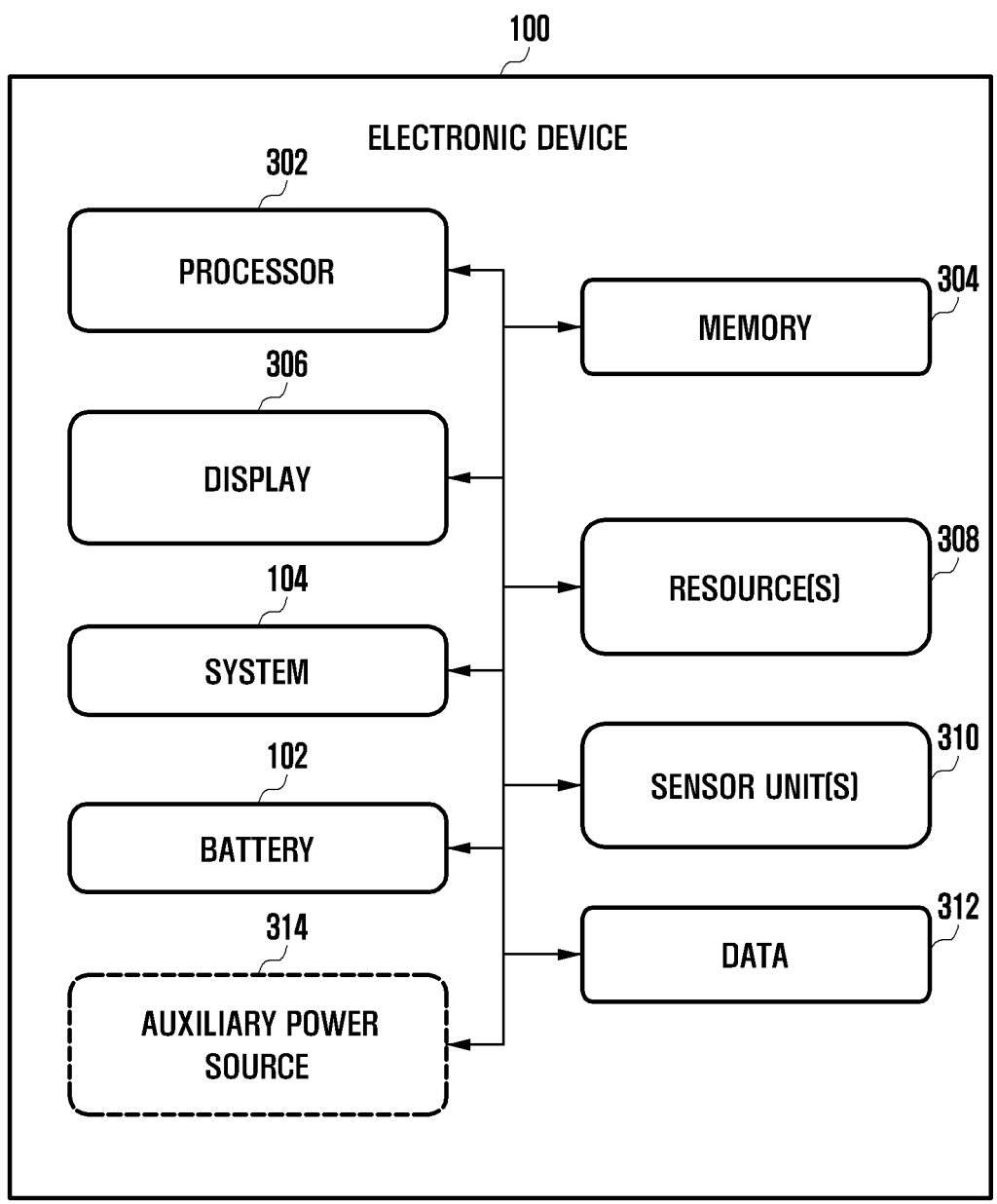
FIG. 3 illustrates a schematic block diagram of the electronic device, according to an embodiment.

FIG. 3 illustrates a schematic block diagram of the electronic device 100, in accordance with an embodiment. The features described above with reference to FIGS. 1 and 2 will not be repeated.

The electronic device 100 may include at least one processor 302, a memory 304, a display 306, a resource(s) 308, one or more sensor units, i.e., sensor unit(s) 310, a data 312, the system 104, and the battery 102. The processor 302, the memory 304, the display 306, the resource(s) 308, the sensor unit(s) 310, and/or the system 104 may be communicatively coupled with each other via a bus. The electronic device 100 may also include an auxiliary power source 314 that can power the electronic device 100 in the absence of or in conjunction with the battery 102.

The electronic device 100 may also include one or more input devices such as a microphone, a stylus, a number pad, a keyboard, a cursor control device, such as a mouse, and/or a joystick, etc., and/or any other device operative to interact with the electronic device 100. The electronic device 100 may also include a driving mechanism such as gear systems, clutch systems, steering systems, etc., capable of being operated in manual mode and/or auto-mode. The electronic device 100 may also include one or more output devices such as speakers, etc. Further, the data 312 may serve, among other things, as a repository for storing data processed, received, and/or generated (e.g., by the system 104).

The processor 302 may be a single processing unit or a number of units, all of which could include multiple computing units. The processor 302 may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 302 may be configured to fetch and/or execute computer-readable instructions and/or data 312 or data stored in the memory 304.

The memory 304 may include any non-transitory computer-readable medium including, for example, volatile memory, such as SRAM and/or DRAM, and/or non-volatile memory, such as ROM, EPROM, flash memory, hard disks, optical disks, and/or magnetic tapes.

The display 306 may display various types of information (for example, multimedia data, text data, etc.) to a user of the electronic device 100. The display 306 may include, but is not limited to, a liquid crystal display (LCD), a light-emitting diode (LED) display, an organic LED (OLED) display, a plasma cell display, an electronic ink array display, an electronic paper display, a flexible LCD, a flexible electro-chromic display, and/or a flexible electro-wetting display.

The resource(s) 308 may be physical and/or virtual components of the electronic device 100 that provide inherent capabilities and/or contribute toward the performance of the electronic device 100. Examples of the resource(s) 308 may include, but are not limited to, memory (e.g., the memory 304), power unit (e.g. the battery 102 and/or the auxiliary power source 314), a display (e.g., the display 306), etc. The resource(s) 308 may include a power unit/battery unit, a network unit, etc., in addition to the processor 302, the memory 304, and the display 306. The sensor unit(s) 310 may include an accelerometer, a gyroscope, a location sensor, a grip sensor, a biometric sensor, an audio module, location/position detection sensor, etc.

With reference again to FIG. 2, in accordance with the embodiments of the present disclosure, the determining module 224 may measure, over a period of time, a plurality of parameters relating to charging and discharging cycles of the battery 102 to determine a variation in a capacity of the battery 102. The plurality of parameters includes current, voltage, and temperature. The determining module 224 may acquire or measure data pertaining to the plurality of parameters during a current cycle of the battery 102. The current cycle can be either a charging cycle or a discharging cycle. The determining module 224 may acquire the data pertaining to the plurality of parameters using various appropriate techniques.

The determining module 224 may determine an incremental capacity (IC) curve for the current cycle of the battery 102. The determining module 224 may obtain the IC curve by performing IC analysis using the data acquired pertaining to the current and voltage. The IC analysis is a method for investigating the capacity of a battery by tracking electrochemical properties of the battery and is based on differentiation of the capacity of the battery over the measured or acquired voltage, for a full or a partial cycle. The IC depicts a capacity change associated with a voltage step. As such, the IC curve identifies a relation between a capacity of the battery overvoltage, for a full or a partial cycle using the following equation (1), where Q is the charged capacity and U is the voltage.

$$ICA(U)\left(\frac{Ah}{V}\right) = \frac{dQ(U)\ (Ah)}{d(U)(V)} \qquad \text{Equation 1}$$

Upon expiry of the current cycle, the parameter module 226 may derive a first data corresponding to a plurality of features from the incremental capacity curve based on data pertaining to the plurality of parameters acquired during the current cycle. The plurality of features includes peak of the IC curve and resistance. A peak in the IC curve has a unique shape, intensity, and position, and exhibits an electrochemical process taking place in the battery. The IC curve is sensitive to resistance of the battery, i.e., internal resistance, and is generally different for charging and discharging cycles. The resistance of the battery is also dependent on the battery SOC. The efficiency of the battery decreases with increase in the internal resistance, and thermal stability of the battery is reduced as more of the charging energy is converted into heat.

The parameter module 226 may further obtain, from the memory 204, a second data, for example, the historical data 218, corresponding to the plurality of features from an incremental capacity curve determined for a predetermined number of cycles over a predetermined time period prior to the current cycle. The number of cycles is determined based on maximum allowable degradation conditions. In an example, a maximum allowable degradation condition can be two, for example, equal degradation levels during a charge and discharge cycle, and different degradation levels during a charge and discharge cycle at a constant charging current. The cycling refers to a decrease in a capacity of a battery based on charging and discharging of a battery, and capacity degradation is predicted as a function of the SOC and current. Thus, for example, when a cycling of a battery is performed at a maximum allowable current in a maximum SOC range, the cell reaches an end of a life capacity (for example, 80% of a capacity of a new cell) after "1000" cycles. As such, the number of cycles is determined as "1000". The number of cycles may be predetermined at a time of manufacturing the battery 102 and stored in the memory 204.

To obtain the second data, the determining module 224 may obtain data pertaining to the plurality of parameters during an operating state of the battery 102 over the predetermined number of cycles. The operating state of the battery 102 is one of a charging of the battery and discharging of the battery. In an example, the determining module 224 may obtain data pertaining to the plurality of parameters of the battery 102 for 1000 cycles from an initial time of using the battery 102 including charging cycles and discharging cycles. Based on the plurality of parameters and the cycles, the determining module 224 may determine or plot a capacity vs cycle number graph.

Figure 4A:
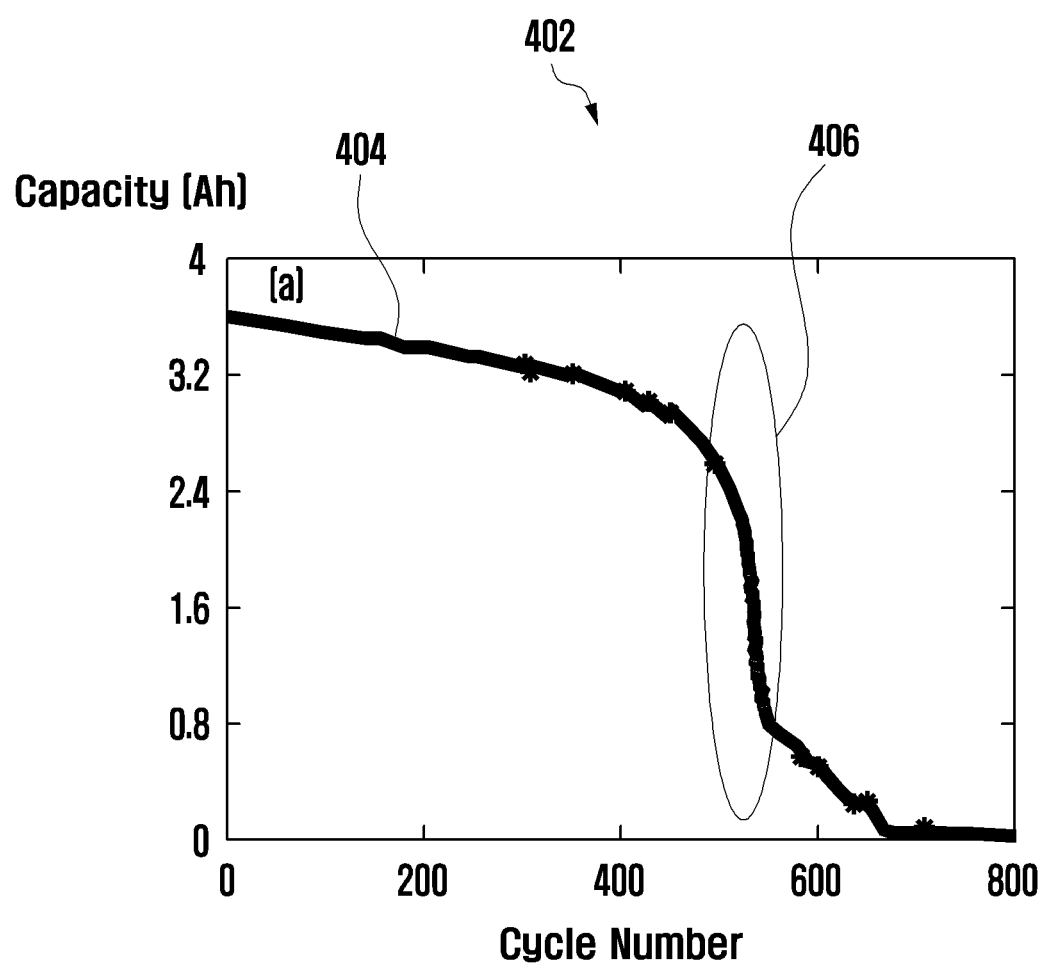
FIGS. 4A, 4B, 4C, 4D, and 4E illustrate various experimental plots obtained for predicting the onset of capacity fade in the battery, according to an embodiment.

In an example, referring to FIG. 4A, capacity vs cycle number graph 402 of the battery 102 is illustrated. The capacity vs cycle number graph 402 is plotted between capacity and cycle numbers. A horizontal axis of the graph 402 represents cycles in numbers and a vertical axis of the graph 402 represents capacity in ampere hour (Ah). Cycle is conducted by passing constant current to the battery 102, with the cell voltage going from discharged state of minimum voltage, Vmin, to charged state of maximum voltage, Vmax. The total current passed to charge or discharge the cell is added and that capacity is plotted as the graphs. As can be gathered from the FIG. 4A, curve 404 illustrates normalized capacity of the battery after every cycle. A steep fall in capacity 406 is observed in the curve 404 after 500 cycles and the capacity has completely degraded after 700 cycles. Thus, the capacity reduces as the battery 102 ages or degrades.

Figure 4B:
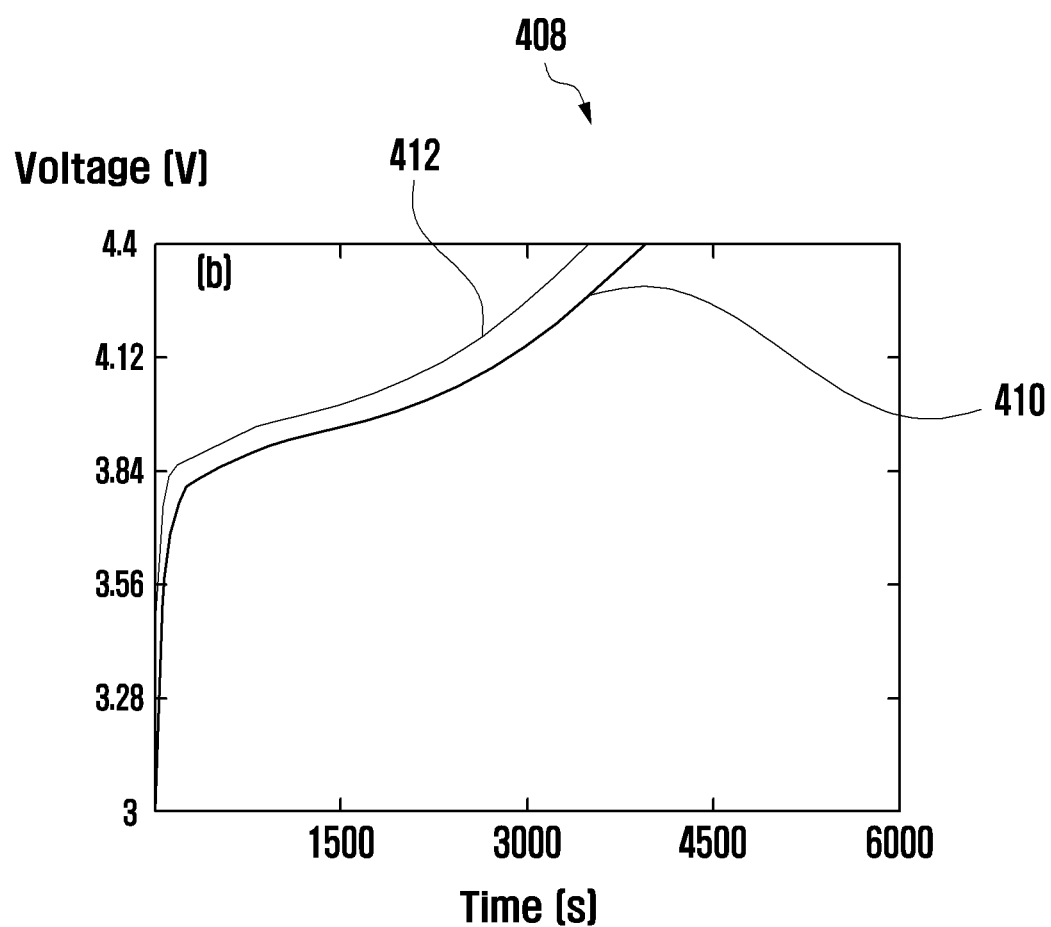

The determining module 224 may determine the incremental capacity curve for the battery 102 based on the obtained data for each of the predetermined number of cycles, in a manner as described above. The determining module 224 may derive and store the second data corresponding to the plurality of features from the incremental capacity curve in the memory 204, as the historical data 218. In the example mentioned above, and referring to FIG. 4B, voltage profile 408 of the battery 102 is illustrated. The voltage profile 408 is derived from the capacity vs cycle number graph 402. The voltage profile 408 indicates a voltage response of the battery 102 within a charge cycle or discharge cycle. A vertical axis of the voltage profile 408 represents voltage and a horizontal axis of the voltage profile 408 represents time in seconds. Curve 410 depicts a voltage profile for cycle #2 and curve 412 depicts a voltage profile for cycle #256. As can be gathered from the figure, the voltage reaches maximum voltage at cycle #256 earlier as compared to cycle #2 for the same charging current. This shows a loss in capacity of the battery 102.

Figure 4C:
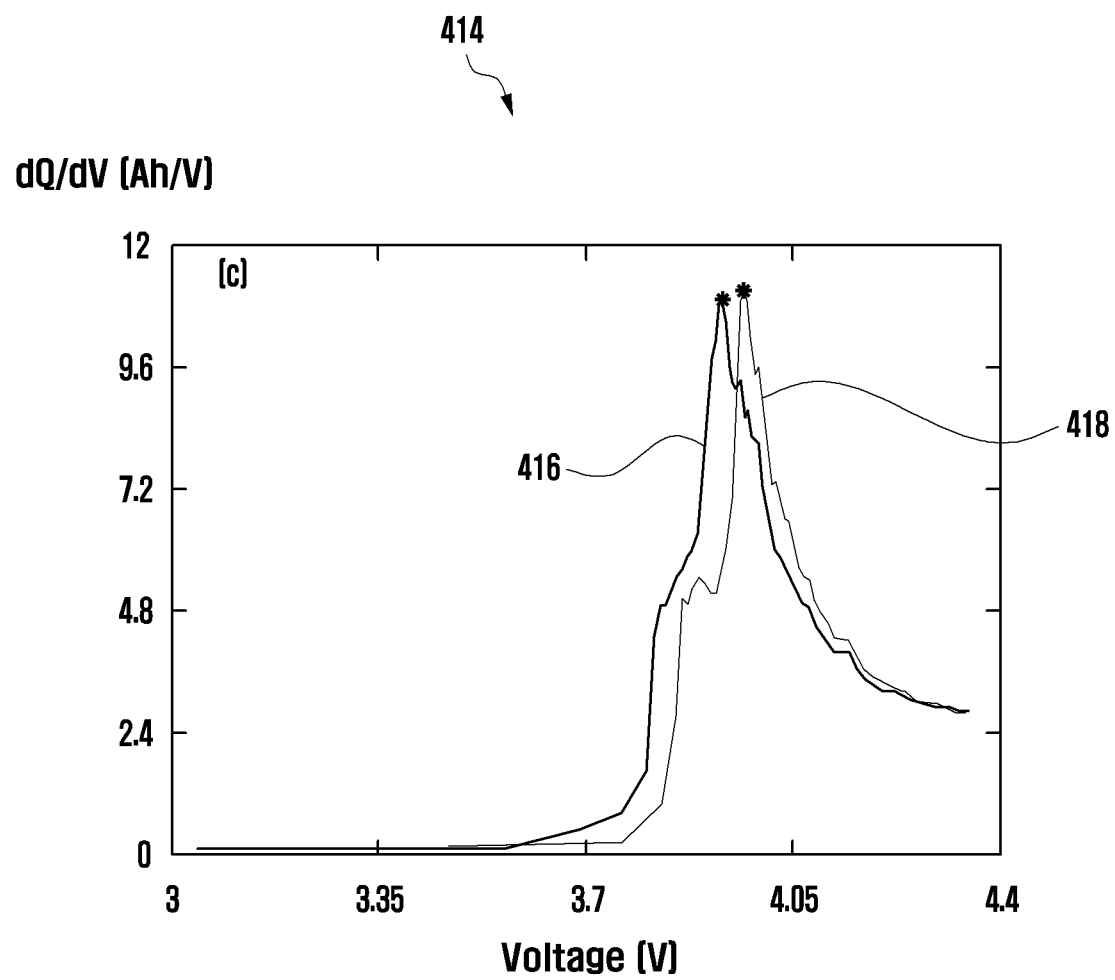

Further, referring to FIG. 4C, IC curve graph 414 obtained after performing IC analysis on the voltage profiles 408 is illustrated. A horizontal axis of the IC curve graph 414 represents differentiation of the voltage and a vertical axis of the graph 414 represents rate of change of the capacity. IC curve 416 represents capacity degraded at cycle 2 and IC curve 418 represents capacity degraded at cycle 256. The IC curve 416 and the IC curve 418 are obtained by applying data of curve 410 and curve 412, respectively, to the equation 1 mentioned earlier. IC curve 416 has a peak position at 3.8V and IC curve 418 has a peak position at 3.9 V. It may be understood, initial IC curve graph may include noise. As such, filters are applied to the initial IC curve graph to smooth the initial IC curves and obtained the IC curves 416, 418. Examples of the filters include, but not limited to, Moving Average (MA) filter and Gaussian filter.

Figure 4D:
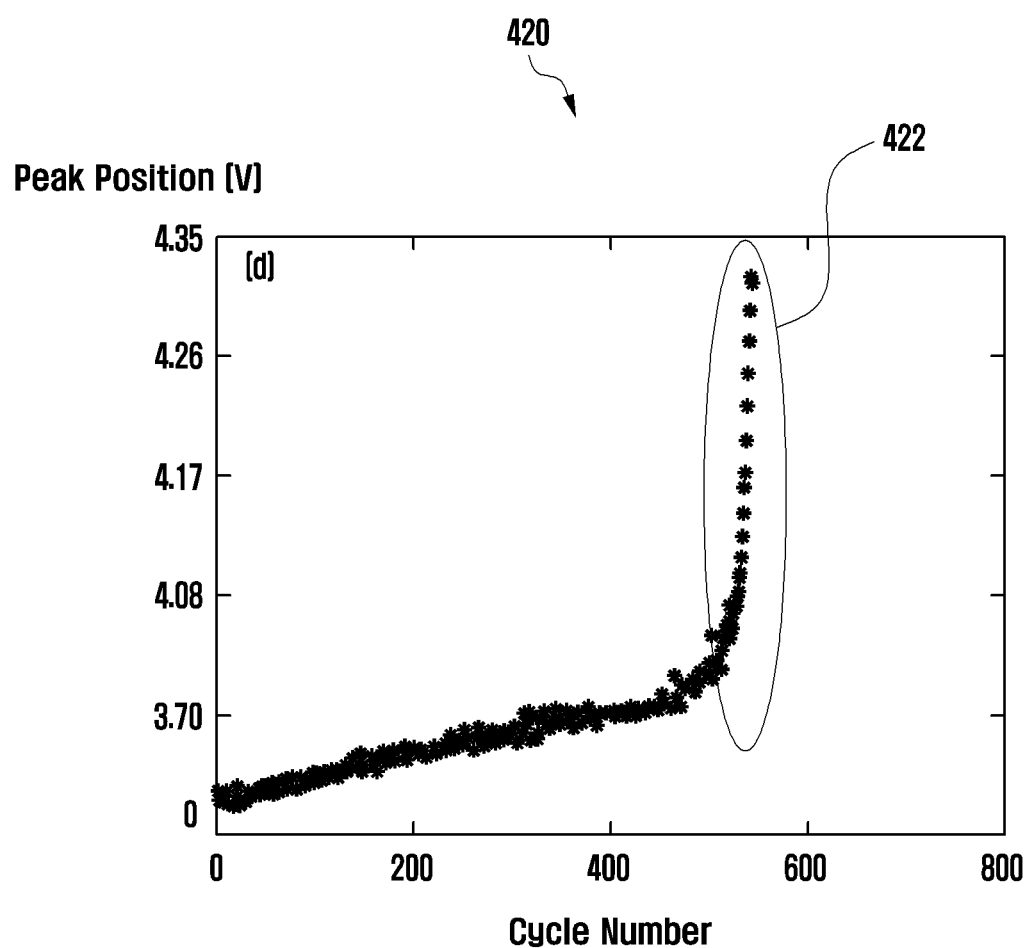

Upon obtaining the second data, the determining module 224 may determine a variation in each the plurality of features for the current cycle based on the first data and the second data. As an example, the variation is determined as a shift in a peak position. As another example, the variation is determined as increase in a resistance. In the example mentioned above, and referring to FIG. 4D, graph 420 derived from the IC curve graph 414 is illustrated. Graph 420 depicts peak positions of the IC curves corresponding to various cycles. As such, a horizontal axis of the graph 420 represents cycle numbers and a vertical axis of the graph 420 represents voltage at which peak position is identified. The graph 420 is obtained by tracking the position of the peak, as seen on X-axis in the graph 414 for each cycle. As can be gathered, steep change 422 in the peak position in IC curves is observed indicative of capacity falloff.

Figure 4E:
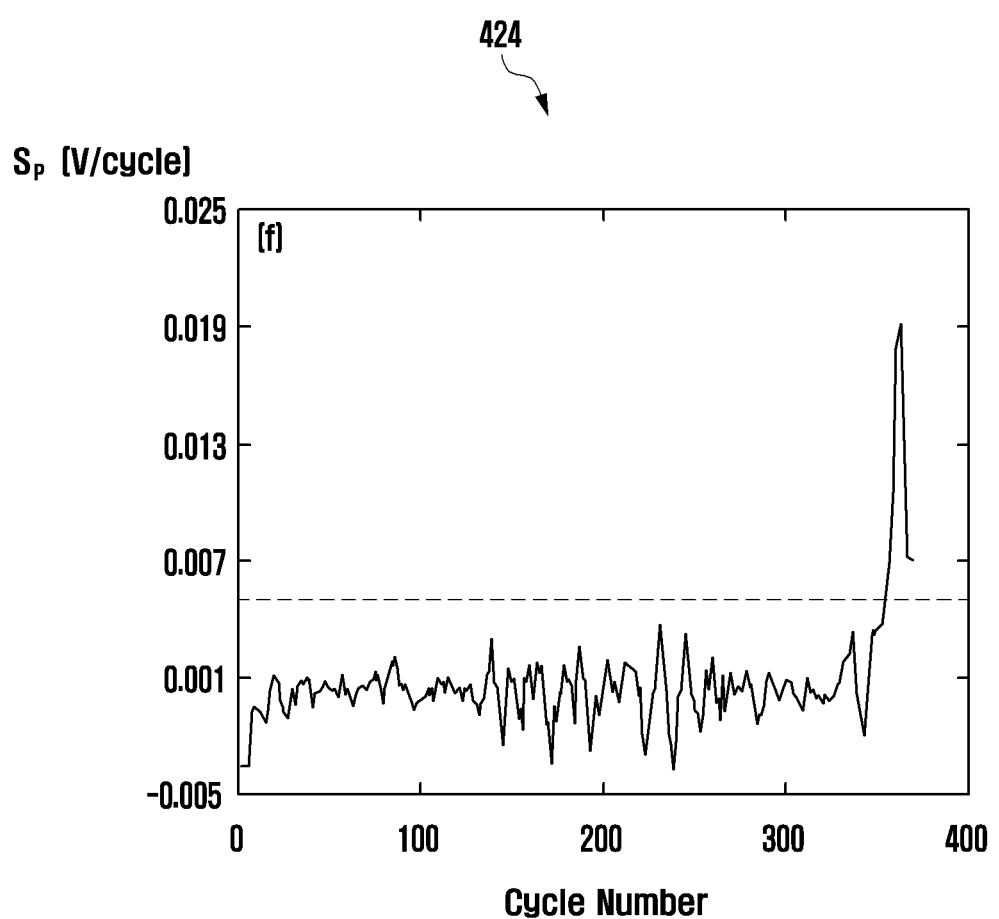

Upon determining the variation, the analysis module 228 may determine a rate of variation for each of the plurality of features for the current cycle. In an example, the rate of variation is determined based on a slope of variation of a peak position with cycle number. In the example mentioned above, and referring to FIG. 4E, graph 424 illustrates the slope of variation of the peak positions with cycle numbers. The graph 424 is an average slope of graph 420, as taken over about 5-10 cycles. As can be gathered, until $500^{th}$ cycle, the slope remains constant. However, after $500^{th}$ cycle, the slope increases steeply indicating steep fall off in the capacity fade.

Upon determining the rate of variation, the analysis module 228 may predict the onset of the capacity fade in the battery 102 based on the determined rate of variation and a threshold value. The threshold value may indicate a maximum permissible value of the rate of variation before the non-linear capacity fall. The value of slope as illustrated the graph 424 is consistent for a type of cell or battery undergoing typical charging. The threshold value is determined from an initial characterization test and/or modeling of various types of batteries. The threshold value may be stored in the memory 304. In the present example, the threshold value is determined as 0.006 V/cycle. In an example, the analysis module 228 may predict the onset of capacity fade when the rate of variation is higher than the threshold value. The related art systems infer capacity of the battery from an amplitude of the peak and the resistance that are derived from the IC curve. However, such inference cannot predict nonlinear capacity fading behavior, which might occur in near future. Exemplary embodiments, in contrast, can predict the occurrence of steep fall in capacity or non-linear capacity fall earlier, for example, with approximately 10 to 20 cycles lead time, by monitoring the rate of variation for the plurality of features.

Further, in an example embodiment, the analysis module 228 may determine the threshold value from the learned model 222. The analysis module 228 may obtain the learned model 222 based on the training data 214 and the estimated data 216. The estimated data 216 is indicative of: (a) a reduction in a maximum charged capacity of each of a set of representative batteries for the predetermined number of cycles over the predetermined time period; and (b) an increase in resistance within each of the set of representative batteries for the predetermined number of cycles. In an example, the representative battery may have the same or substantially similar electrochemical properties as that of the battery 102 and may have the same or similar capacity as that of the battery 102. In an example, the set of representative batteries may include at least 5 batteries.

The training data 214 relates to the set of representative batteries such as data pertaining to a plurality of parameters obtained over various cycles, derived IC curves, etc. As described earlier, capacity is defined available electric charge stored in a battery after the battery is fully charged. The capacity reduces with increase in C-rate, i.e., rate at which a battery is discharged relative to its maximum capacity. However, internal resistance increases with decrease in capacity. The estimated data 216 may be obtained by testing the plurality of representative batteries in a laboratory. To obtain the learned model 222, the analysis module 228 may apply one or more learning algorithms 220 to the training data 214 and the estimated data 216. The analysis module 228 may apply current data, i.e., the rate of variation, to the learned model 222 and obtain an output as classification if the battery 102 is going to degrade rapidly or not. In an example, the battery 102 is undergoing regular degradation when the output is below the threshold value. In an example, the battery 102 is undergoing rapid degradation when the output is above the threshold value.

Upon predicting the onset of the capacity fade, the analysis module 228 may provide a notification on the electronic device 100 indicating the predicted onset of the capacity fade. The notification can be a visual notification, e.g., audio, icon, text, light, etc. The analysis module 228 may display the notification on the display 306.

In an embodiment, the analysis module 228 may perform at least one action in response to the predicted onset of the capacity fade. The analysis module 228 may interact or communicate with the various components of the electronic device 100, for example, sensors(s), driving mechanisms, display, etc., to perform at least one action. In an embodiment, the analysis module 228 may re-distribute active load on the battery 102. In an embodiment, the analysis module 228 may provide a notification on the electronic device 100 of a location of a charging point. In an embodiment, the analysis module 228 may cause a movement of the electronic device 100 toward the location of the charging point. In an embodiment, the analysis module 228 may change power mode of the electronic device 100 from a high power mode to a low power mode. In an embodiment, the analysis module 228 may shut down the power mode of the electronic device 100. In an embodiment, the analysis module 228 may apply an optimal charging profile during charging of the battery 102.

Further, in applying the optimal charging profile, the analysis module 228 may determine a current SOH of the battery 102. The SOH of a battery represents a measure of the ability of the battery to store and deliver electrical energy, compared with a new battery. The analysis module 228 may determine the current SOH using appropriate related art techniques.

The analysis module 228 may determine the optimal charging profile based on the current SOH of the battery 102, the learned model 222, and the predicted onset of the capacity fade. The optimal charging profile defines a current, a voltage, or a combination thereof for charging the battery 102 at optimal charge rate. In an example, the optimal charging profile is determined as constant current profile for charging the battery 102 when the capacity fade is predicted with 10-12 cycles lead time. As another example, the optimal charging profile is determined as constant current profile having a substantially lower current value when fast or rapid degradation is predicted. Such optimal charging profile minimizes degradation and maximizes available or remaining capacity. The analysis module 228 may apply the determined optimal charging profile during charging of the battery 102. In an example, the analysis module 228 may detect charging of the electronic device 100 using appropriate related art techniques. The analysis module 228 may then apply optimal charging profile using appropriate related art techniques.

Figure 5A:
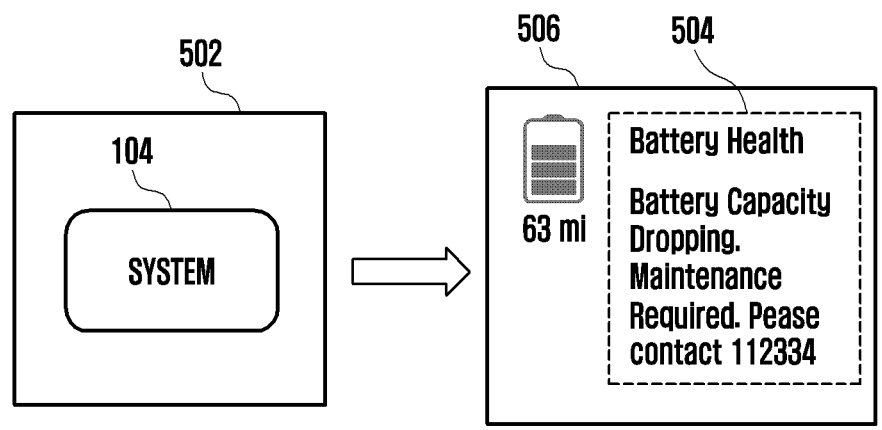
FIGS. 5A, 5B, 6, 7, and 8 illustrate various examples according to an embodiment.
Figure 5B:
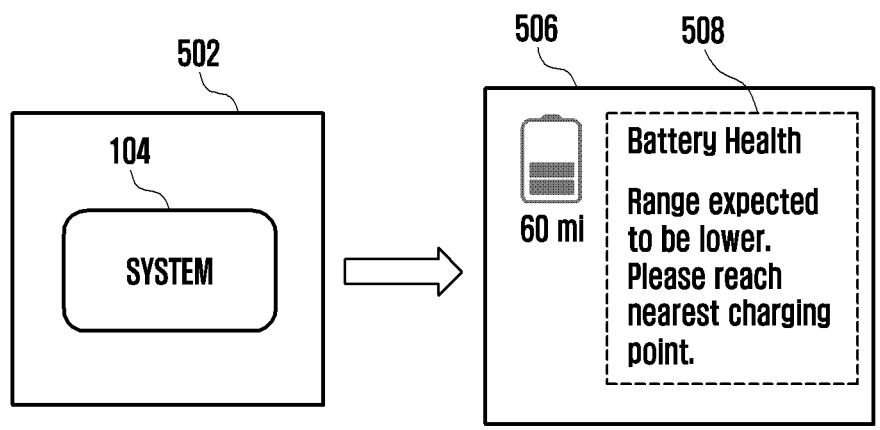

FIGS. 5A to 8 illustrate various examples according to an embodiment. In one example, referring to FIGS. 5A and 5B, the electronic device 100 is embodied in an electric vehicle 502. In the related art system, the electric vehicle may come to a sudden halt due to sudden capacity drop in the battery 102. In an embodiment, the electric vehicle 502 includes the system 104. As such, the system 104 may predict the onset of the capacity fade prior to the battery 102 being dead and performs one or more actions. The system 104 may provide audio notification or visual notification on a dashboard of the electric vehicle. The system 104 may also take corrective action, such as controlling the speed of the electric vehicle, to avoid abrupt stop. The system 104 may perform active load re-distribution to avoid undesirable or even catastrophic events. The system 104 may provide audio notification or visual notification indicative of nearest charging point(s) on the dashboard of the electric vehicle. Referring to FIG. 5A, the system 104 determines the capacity is fading at 63 miles and provides a notification 504 on a dashboard 506. The notification 504 alerts an operator of the electric vehicle 502 to contact service center as the battery capacity is dropping. Referring to FIG. 5B, the system 104 determines the capacity is rapidly fading at 60 miles and provides a notification 508 on the dashboard 506. The notification 508 alerts the operator of the electric vehicle 502 to reach the nearest charging point as the battery capacity is dropping.

Figure 6:
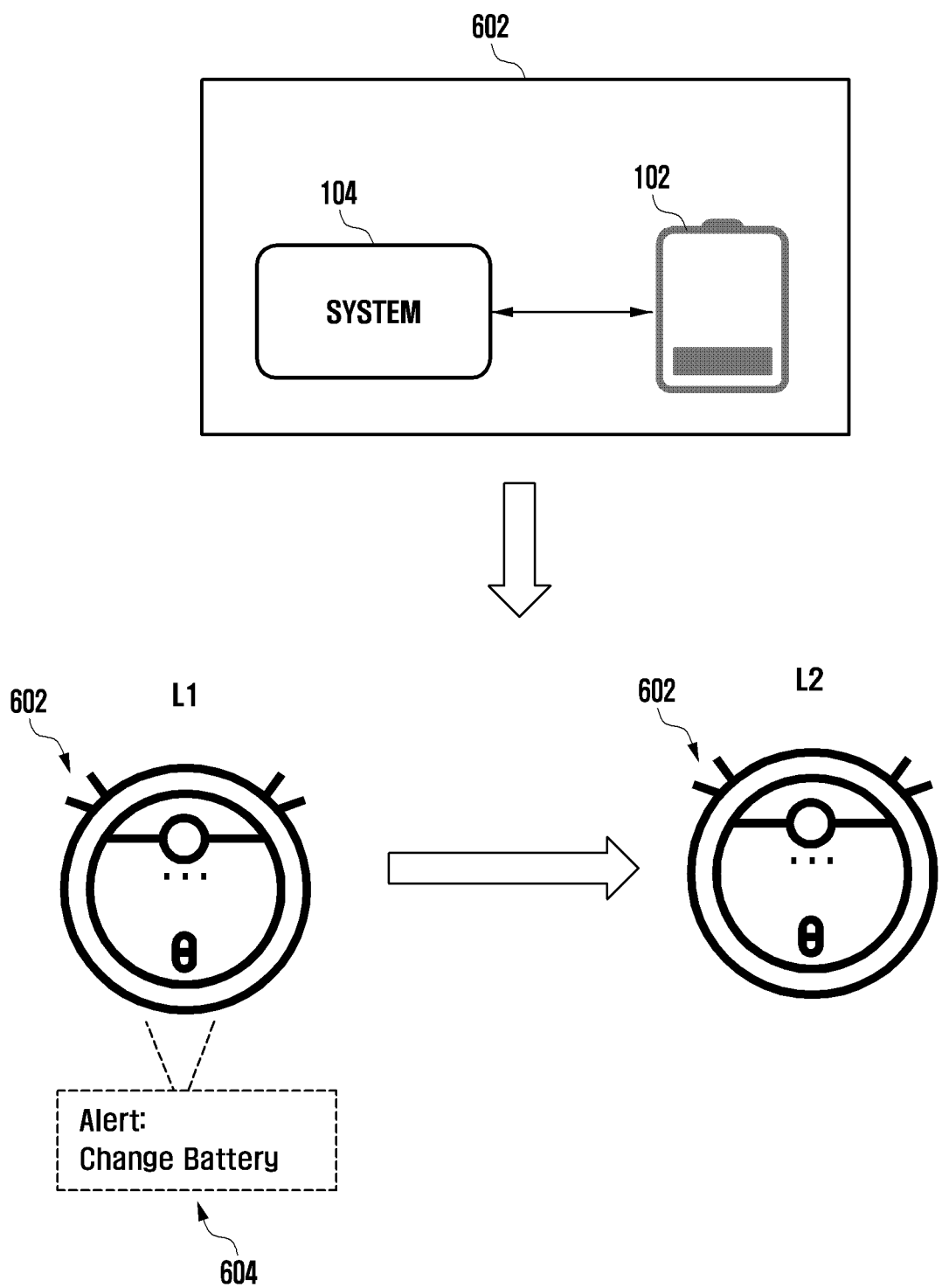

In an embodiment, referring to FIG. 6, the electronic device 100 is embodied as a smart or robotic vacuum cleaner 602 operating in a home. In the related art system, the robotic vacuum cleaner may stop operating abruptly due to sudden capacity drop in the battery 102. In an embodiment, the robotic vacuum cleaner 602 includes the system 104. As such, the system 104 may provide audio notification or visual notification to alert a user to change or replace the battery 102. The system 104 may also operate the robotic vacuum cleaner in an optimized manner to avoid sudden halt in operation. The system 104 may cause the robotic vacuum cleaner 602 to move to nearest charging point in the home. Referring to FIG. 6, the robotic vacuum cleaner 602 is at location L1. The system 104 determines the capacity is fading rapidly and provides a notification 604, e.g., on a display and/or via a speaker. The notification 604 alerts an operator of the robotic vacuum cleaner 602 to change the battery 102. The system 104 also causes the robotic vacuum cleaner 602 to move to nearest charging point at location L2.

Figure 7:
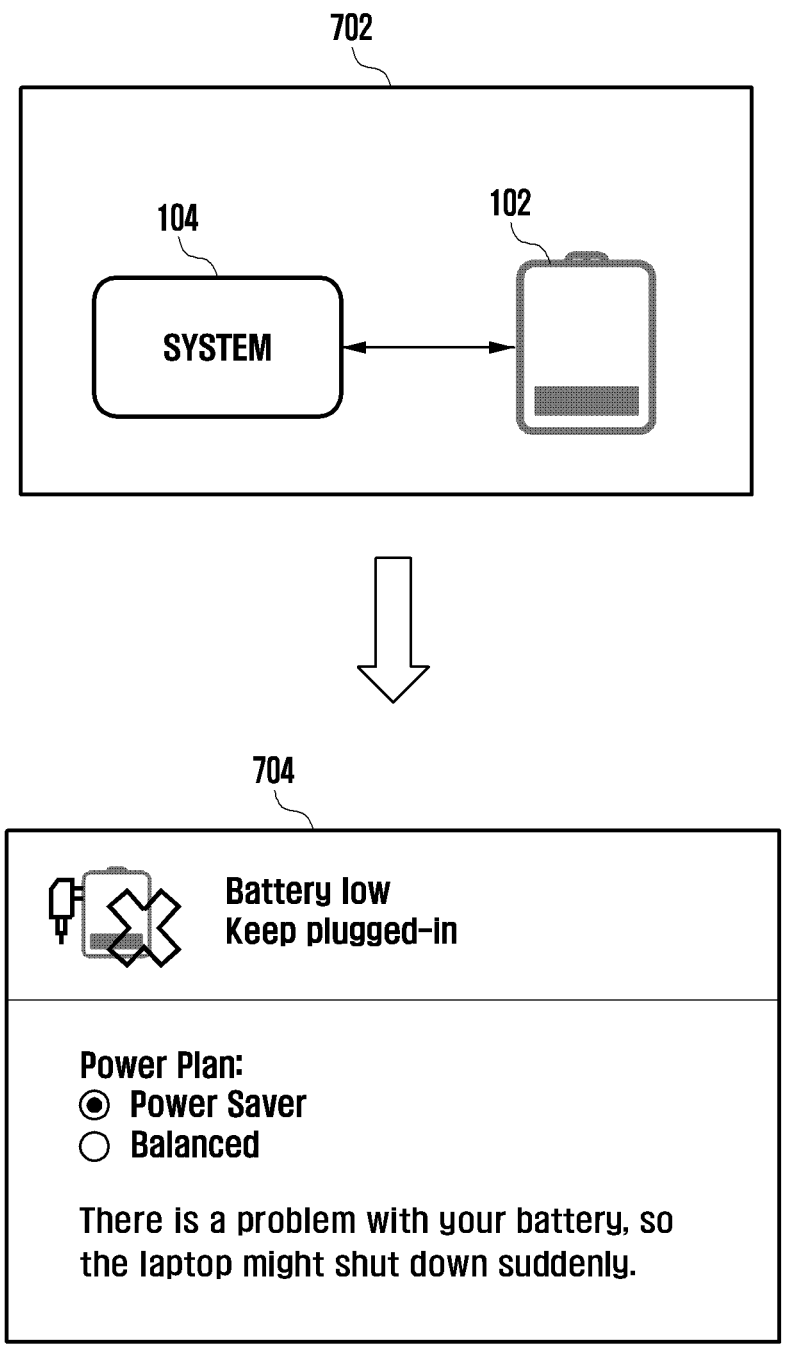

In an embodiment, referring to FIG. 7, the electronic device 100 is embodied in a laptop 702. In the related art system, the laptop may stop operating abruptly due to sudden capacity drop in the battery 102, leading to loss of data. In an embodiment, the laptop 702 includes the system 104. As such, the system 104 may provide a floating textual notification on the laptop 702 to indicate onset of capacity fade. The system 104 may also operate the laptop in a low power mode. Referring to FIG. 7, the system 104 determines the capacity is fading rapidly in the laptop 702 and provides a notification 704. The notification 704 alerts an operator of the laptop 702 to change the battery 102 and/or to keep the laptop 702 plugged in.

As an example, the electronic device 100 is embodied in a smartphone. As such, the system 104 may re-distribute active load on the battery 102 by way of killing or terminating one or more applications that are consuming higher power, or disabling one or more network interfaces, etc.

As another example, the electronic device 100 is embodied in a commercial energy storage apparatus. As such, the system 104 may activate a redundant power source such as the auxiliary power source 314 upon predicting the onset of the capacity fade.

Figure 8:
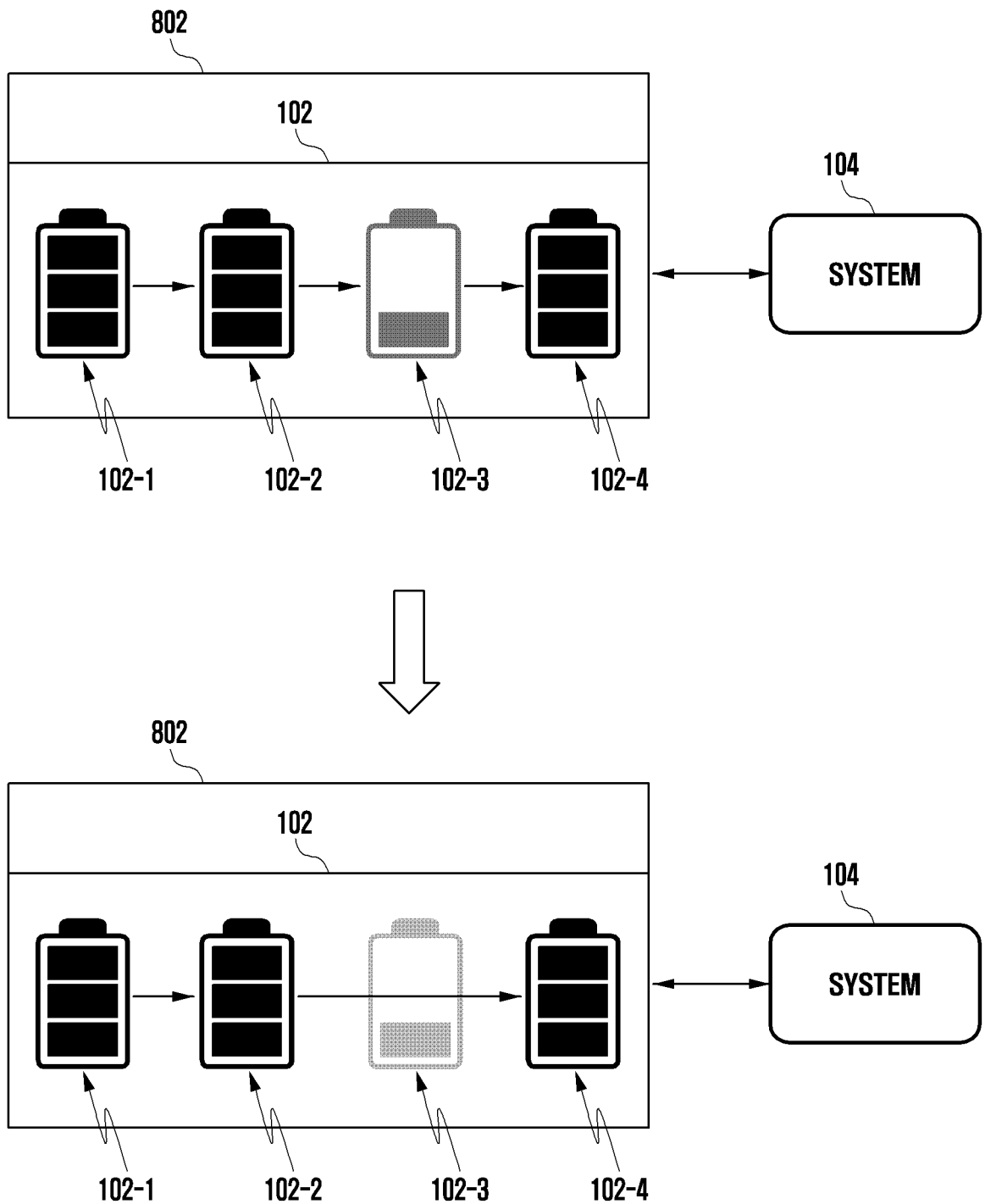

In an embodiment, referring to FIG. 8, the electronic device 100 is embodied as a home power back-up apparatus 802 wherein the battery 102 includes multiple cells 102-1, 102-2, 102-3, and 102-4. In the related art systems, a user may experience power cuts or outage or stopping of critical power devices like air conditioner or heater in event of sudden capacity drop in the battery 102. In an embodiment, the home power back-up apparatus 802 includes the system 104. As such, the system 104 may provide audio notification or visual notification to alert a user to change or replace the battery 102. The system 104 may re-distribute the power among the multiple cells. The system 104 may isolate or bypass the faulty cell and restore power capability. Referring to FIG. 8, the system 104 detects the capacity is fading rapidly in the cell 102-3. The system 104 may bypass the faulty cell 102-3 and restore power capability.

FIG. 9 illustrates a flow diagram of a method 900 predicting onset of capacity fade in a battery in an electronic device, in accordance with an embodiment of the disclosure. The method 900 may be implemented by the system 104 using components thereof, as described above. In an implementation, the battery is a lithium-ion battery. Further, for the sake of brevity, details of the present disclosure that are explained in details in the description of FIGS. 1 to 4 are not explained in detail in the description of FIG. 9.

At block 902, the method 900 includes measuring, over a period of time, a plurality of parameters relating to charging and discharging cycles of the battery, to determine a variation in a capacity of the battery. The plurality of parameters includes at least from among current, voltage, and temperature. For example, the determining module 224 of the system 104 may measure, over a period of time, the plurality of parameters relating to charging and discharging cycles of the battery 102, to determine a variation in a capacity of the battery.

At block 904, the method 900 includes detecting, based on the measured plurality of parameters, the onset of the capacity fade in the battery. For example, the analysis module 228 of the system 104 may detect the onset of the capacity fade in the battery 102 based on the measured plurality of parameters.

At block 906, the method 900 includes providing a notification on the electronic device indicating the detected onset of the capacity fade. For example, the analysis module 228 of the system 104 may provide the visual notification 110 on the electronic device 100.

The method 900 may include further steps for determining the variation in the capacity of the battery at block 902. As such, the method 900 may include determining an incremental capacity curve for a current cycle of the battery. For example, the determining module 224 may determine the IC curve for the current cycle of the battery 102.

The method 900 includes deriving, upon expiry of the current cycle, a first data corresponding to a plurality of features from the incremental capacity curve based on data pertaining to a plurality of parameters acquired during the current cycle. The plurality of features includes peak of the incremental capacity curve and resistance. For example, the parameter module 226 of the system 104 may derive the first data.

The method 900 includes obtaining, from a memory, a second data corresponding to the plurality of features from an incremental capacity curve determined for a predetermined number of cycles over a predetermined time period prior to the current cycle. The number of cycles is determined based on maximum allowable degradation conditions. For example, the parameter module 226 may obtain the second data from the memory 204.

The method 900 includes determining variation in each of the plurality of features for the current cycle based on the first data and the second data. For example, the determining module 224 may determine the variation in each of the plurality of features.

The method 900 may include further steps for detecting the onset of the capacity fade at block 904. As such, the method 900 may include determining a rate of variation for each of the plurality of features for the current cycle. For example, the analysis module 228 may determine the rate of variation.

The method 900 includes predicting onset of the capacity fade in the battery based on the determined rate of variation and a threshold value. For example, the analysis module 228 may predict the onset of the capacity fade.

In an embodiment, the threshold value may be determined from a learned model. The learned model is obtained from a training data; and an estimated data indicative of (a) a reduction in a maximum charged capacity of each of a set of representative batteries for the predetermined number of cycles over the predetermined time period and (b) an increase in resistance within each of the set of representative batteries. For example, the analysis module 228 may obtain the learned model 222 and may determine the threshold value.

In an embodiment, the method 900 includes performing at least one action in response to the predicted onset of the capacity fade. In an embodiment, the action includes providing a notification on the electronic device indicating the predicted onset of the capacity fade. In an embodiment, the action includes re-distributing active load on the battery. In an embodiment, the action includes providing a notification on the electronic device indicating a location of a charging point. In an embodiment, the action includes causing a movement of the electronic device toward the location of the charging point. In an embodiment, the action includes changing power mode of the electronic device from a high power mode to a low power mode. In an embodiment, the action includes shutting down the power mode of the electronic device. In an embodiment, the action includes applying optimal charging profile during charging of the battery. For example, the analysis module 228 may perform the at least one action.

The method 900 may include further steps for applying the optimal charging profile. As such, the method 900 includes determining a current SOH of the battery. The method 900 includes determining an optimal charging profile based on the current SOH of the battery, the learned model, and the predicted onset of the capacity fade. The optimal charging profile defines a current, a voltage, or a combination thereof for the charging the battery at optimal charge rate. The method includes applying the optimal charging profile during charging of the battery. For example, the analysis module 228 may determine the optimal charging profile and apply the optimal charging profile during charging of the battery 102.

Thus, the present disclosure enables predicting the occurrence of such event of non-linear drop in battery. Further, at least on action can be performed in response to the predicted onset of the capacity fade, including, at least visually indicating the user about the predicted onset of the capacity fade. This results in preventing untoward incidents and leads to enhanced user-experience with increased safety.

While specific language has been used to describe the present disclosure, any limitations arising on account thereto, are not intended. As would be apparent to a person in the art, various working modifications may be made to the method in order to implement the inventive concepts as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. The present disclosure may be variously embodied, and practiced within the scope of the following claims.

The invention claimed is:

1. A method of determining an onset of a capacity fade in a battery in an electronic device, the method comprising:
    measuring, over a period of time, a plurality of parameters related to charging and discharging cycles of the battery;
    determining, based on the measured plurality of parameters, the onset of the capacity fade in the battery; and
    providing a notification on the electronic device indicating the onset of the capacity fade,
    wherein the determining of the onset of the capacity fade comprises:
    determining an incremental capacity curve for a current cycle of the battery,
    deriving, upon expiry of the current cycle, a first data corresponding to a plurality of features from the incremental capacity curve based on data pertaining to the plurality of parameters acquired during the current cycle,
    obtaining a second data corresponding to the plurality of features obtained from an incremental capacity curve determined for the charging and discharging cycles of the battery over the period of time prior to the current cycle, based on the measured plurality of parameters; and
    determining a variation in a plurality of features for the current cycle based on the first data and the second data, thereby determining a variation in a capacity of the battery.

2. The method as claimed in claim 1, wherein the plurality of parameters comprise at least one from among a current, a voltage, and a temperature.

3. The method as claimed in claim 1, wherein the plurality of features comprise at least one from among a peak of the incremental capacity curve and a resistance of the battery.

4. The method as claimed in claim 1, wherein the determining of the onset of the capacity fade further comprises:
    determining a rate of variation for each of the plurality of features for the current cycle; and
    predicting the onset of the capacity fade in the battery based on the determined rate of variation and a threshold value.

5. The method as claimed in claim 4, wherein the method further comprises:
    identifying a voltage value corresponding to a maximum value of a rate of change of the capacity of the battery; and
    based on the identifying that the voltage value is higher than the threshold value, determining that the battery is in the onset of the capacity fade.

6. The method as claimed in claim 4, wherein the threshold value is determined from a learned model obtained from:
    a training data; and
    an estimated data indicative of: (a) a reduction in a maximum charged capacity of each of a set of representative batteries for a predetermined number of cycles over a predetermined time period; and (b) increase in resistance within each of the set of representative batteries for the predetermined number of cycles.

7. The method as claimed in claim 1, further comprising performing at least one action based on the onset of the capacity fade.

8. The method as claimed in claim 7, wherein the at least one action comprises at least one from among:
    re-distributing active load on the battery,
    providing a notification on the electronic device that is indicative of a location of a charging point,
    causing a movement of the electronic device toward the location of the charging point,
    changing a power mode of the electronic device from a higher power mode to a lower power mode,
    shutting down the power mode of the electronic device, and
    applying an optimal charging profile during charging of the battery.

9. The method as claimed in claim 8, wherein the at least one action comprises the applying of the optimal charging profile, and
    the applying of the optimal charging profile comprises:
    determining a current state of health (SOH) of the battery;
    determining the optimal charging profile based on at least one from among the current SOH of the battery, a learned model, and the onset of the capacity fade, the optimal charging profile defining at least one from among a current and a voltage for charging the battery at an optimal charge rate; and controlling the charging the battery at the optimal charge rate as determined by the optimal charging profile.

10. An electronic device for determining an onset of a capacity fade in a battery in the electronic device, the electronic device comprising:
a memory; and
at least one processor communicatively coupled to the battery and the memory and configured to:
measure, over a period of time, a plurality of parameters related to charging and discharging cycles of the battery,
determine, based on the measured plurality of parameters, the onset of the capacity fade in the battery, and
provide a notification on the electronic device indicating the onset of the capacity fade,
wherein the at least one processor is further configured to:
determine an incremental capacity curve for a current cycle of the battery,
derive, upon expiry of the current cycle, a first data corresponding to a plurality of features from the incremental capacity curve based on data pertaining to the plurality of parameters acquired during the current cycle,
obtain, from the memory, a second data corresponding to the plurality of features obtained from an incremental capacity curve determined for the charging and discharging cycles of the battery over the period of time prior to the current cycle, based on the measured plurality of parameters, and
determine a variation in a plurality of features for the current cycle based on the first data and the second data, thereby determining a variation in a capacity of the battery.

11. The electronic device as claimed in claim 10, wherein the plurality of parameters comprise at least one from among a current, a voltage, and a temperature.

12. The electronic device as claimed in claim 10, wherein the plurality of features comprise at least one from among a peak of the incremental capacity curve and a resistance of the battery.

13. The electronic device as claimed in claim 10, wherein the at least one processor is further configured to:
determine a rate of variation for each of the plurality of features for the current cycle, and
predict the onset of the capacity fade in the battery based on the determined rate of variation and a threshold value.

14. The electronic device as claimed in claim 13, wherein the at least one processor is further configured to:
identify a voltage value corresponding to a maximum value of rate of a change of a capacity of the battery; and
based on the identifying that the voltage value is higher than the threshold value, determine that the battery is in the onset of the capacity fade.

15. The electronic device as claimed in claim 13, wherein the threshold value is determined from a learned model obtained from:
a training data; and
an estimated data indicative of: (a) a reduction in a maximum charged capacity of each of a set of representative batteries for a predetermined number of cycles over a predetermined time period; and (b) increase in resistance within each of the set of representative batteries for the predetermined number of cycles.

16. The electronic device as claimed in claim 10, wherein the at least one processor is further configured to perform at least one action based on the onset of the capacity fade.

17. The electronic device as claimed in claim 16, wherein the at least one action comprises at least from among:
re-distributing active load on the battery,
providing a notification on the electronic device that is indicative of a location of a charging point,
causing a movement of the electronic device toward the location of the charging point,
changing a power mode of the electronic device from a higher power mode to a lower power mode,
shutting down the power mode of the electronic device, and
applying an optimal charging profile during charging of the battery.

18. The electronic device as claimed in claim 17, wherein the at least one action comprises the applying of the optimal charging profile, and the at least one processor is further configured to:
determine a current state of health (SOH) of the battery,
determine the optimal charging profile based on at least one from among the current SOH of the battery, a learned model, and the onset of the capacity fade, the optimal charging profile defining at least one from among a current and a voltage for the charging the battery at an optimal charge rate, and
control the charging the battery at the optimal charge rate as determined by the optimal charging profile.

* * * * *